(12) United States Patent
Brooks et al.

(10) Patent No.: US 7,336,278 B2
(45) Date of Patent: Feb. 26, 2008

(54) CONTROL OF MULTI-VARIABLE PROCESSES

(75) Inventors: Robin William Brooks, Gerrards Cross (GB); John Gavin Wilson, London (GB); Richard John Thorpe, Poole (GB)

(73) Assignee: Curvaceous Software Limited, Chalfont St. Peter, Gerrards Cross, Buckinghamshire (GB)

( * ) Notice: Subject to any disclaimer, the term of this patent is extended or adjusted under 35 U.S.C. 154(b) by 0 days.

(21) Appl. No.: 10/477,340

(22) PCT Filed: May 8, 2002

(86) PCT No.: PCT/GB02/02110

§ 371 (c)(1),
(2), (4) Date: Jan. 21, 2004

(87) PCT Pub. No.: WO02/095514

PCT Pub. Date: Nov. 28, 2002

(65) Prior Publication Data

US 2004/0113912 A1 Jun. 17, 2004

(30) Foreign Application Priority Data

May 8, 2001 (GB) .................................. 0111215.0

(51) Int. Cl.
*G06T 11/20* (2006.01)
(52) U.S. Cl. ...................................................... 345/440
(58) Field of Classification Search ................. 345/440
See application file for complete search history.

(56) References Cited

U.S. PATENT DOCUMENTS 4,571,685 A 2/1986 Kamoshida (Continued)

FOREIGN PATENT DOCUMENTS

| EP | 0453817 A2 | 10/1991 |
| EP | 0514104 A2 | 11/1992 |
| EP | 0660211 A2 | 6/1995 |
| EP | 0753283 A1 | 1/1997 |

(Continued)

OTHER PUBLICATIONS

Gaston et al., Exact Calculation of the Multiloop Stability Margin, Feb. 1998, IEEE Transactions on Automatic Control, vol. 33, issue 2, pp. 156-171.*

*Primary Examiner*—Jeffery A. Brier
(74) *Attorney, Agent, or Firm*—Davis Bujold & Daniels, P.L.L.C.

(57) ABSTRACT

Control of a multi-variable process involves multi-dimensional representation of the values (Qa-Qh) of the process variables according to individual coordinate axes (Xa-Xh), and response based on sets of values for the process-variables accumulated from multiple, earlier operations of the process. An acceptable range (UL-LL) for each process variable due to the current values of the other variables is defined from the accumulated values, and the existence of an alarm condition in which the current value (Qg) of a variable lies outside the range defined for it, is detected and displayed (UC) on the relevant axis (Xg). The change of the values (Qa,Qb) of one or more of the manipulatable variables (a-c) required to rectify the alarm condition is determined iteratively, and implemented by operator or automated response.

17 Claims, 9 Drawing Sheets

U.S. PATENT DOCUMENTS

| | | | |
|---|---|---|---|
| 4,675,147 A * | 6/1987 | Schaefer et al. | 345/440 |
| 5,731,998 A * | 3/1998 | Lotito et al. | 345/440 |
| 5,850,339 A | 12/1998 | Giles | |
| 5,917,500 A | 6/1999 | Johnson et al. | |
| 5,949,678 A | 9/1999 | Wold et al. | |
| 6,343,508 B1 * | 2/2002 | Feller | 345/440 |
| 6,879,325 B1 * | 4/2005 | Brooks et al. | 345/440 |
| 2005/0128199 A1 * | 6/2005 | Brooks et al. | 345/440 |

FOREIGN PATENT DOCUMENTS

| | | | |
|---|---|---|---|
| JP | 7-92895 | * | 4/1995 |
| WO | 00/72268 A1 | | 11/2000 |
| WO | 01/38831 A1 | | 5/2001 |

\* cited by examiner

CONTROL OF MULTI-VARIABLE PROCESSES

This application is the national stage completion of PCT/GB02/02110 filed May 8, 2002 which claims priority from British Application Serial No. 0111215.0 filed May 9, 2001.

FIELD OF THE INVENTION

This invention related to methods and systems for control of multi-variable processes.

BACKGROUND OF THE INVENTION

According to one aspect of the present invention a method for control of a multi-variable process, comprises deriving a multi-dimensional representation of the process variables according to individual coordinate axes, defining a feasible region of the process-variables based on sets of values for the process-variables accumulated respectively in relation to multiple operations of the process, defining for each process variable a range due to the values of the other process variables, within which the value of that variable is to lie in order for operation to remain within the feasible region, detecting in respect of each of the variables whether an alarm condition exists in which the current value of that variable lies outside the range defined for it, responding to the existence of said alarm condition to calculate change of the value or values of one or more of the variables required to rectify the alarm condition, and implementing the calculated change.

According to another aspect of the present invention a system for control of a multi-variable process, comprises means for deriving a multi-dimensional representation of the process variables according to individual coordinate axes, means for defining a feasible region of the process-variables based on sets of values for the process-variables accumulated respectively in relation to multiple operations of the process, means defining for each process variable a range due to the values of the other process variables, within which the value of that variable is to lie in order for operation to remain within the feasible region, means for detecting in respect of each of the variables whether an alarm condition exists in which the current value of that variable lies outside the range defined for it, and means responding to the existence of said alarm condition to calculate change of the value or values of one or more of the variables required to rectify the alarm condition, and means for displaying the calculated change.

The definition of the feasible region and the ranges of the process-variables in the method and system of the invention may be carried out using convex hulls or any other closed envelope embracing the data points represented respectively by the accumulated sets of values. A convex hull in orthogonal coordinates is a closed polygon that encloses all relevant data points of the two-dimensional space, whereas in parallel coordinates it is a pair of spaced linear curves that as between corresponding parallel axes, bound the region occupied by the lines that represent (in the parallel-coordinate space) those data points.

The current values of at least some of the process variables and said ranges defined individually for them, may be displayed in said multi-dimensional representation.

SUMMARY OF THE INVENTION

The invention is applicable to optimisation and efficient on-line operation of multi-variable processes, and in this respect the calculated change required to rectify the alarm condition may be implemented by control exercised by an operator in accordance with display of the change. Alternatively, the change may be communicated to a process controller for automated implementation.

BRIEF DESCRIPTION OF THE DRAWINGS

A method and system according to the present invention will now be described, by way of example, with reference to the accompanying drawings, in which.

DETAILED DESCRIPTION OF THE INVENTION

The example of method and system to be described is related to the control of operation of a multi-variable process carried out by a simple processing plant. Details of the plant and its purpose are not of consequence, and indeed the method and system of the invention are related more specifically to operation of the plant as an example of a multi-variable process rather than to the purpose of the process performed, being applicable in the generality to any situation involving a multi-variable process. In the context of initial description of the present specific example, however, there are fourteen variables involved in plant-operation, and of these, eleven are control variables to the extent that their values determine the outcome of the process. The remaining three variables are quality variables in the sense that their values define, or more especially are defined by, that outcome.

Figure 1:
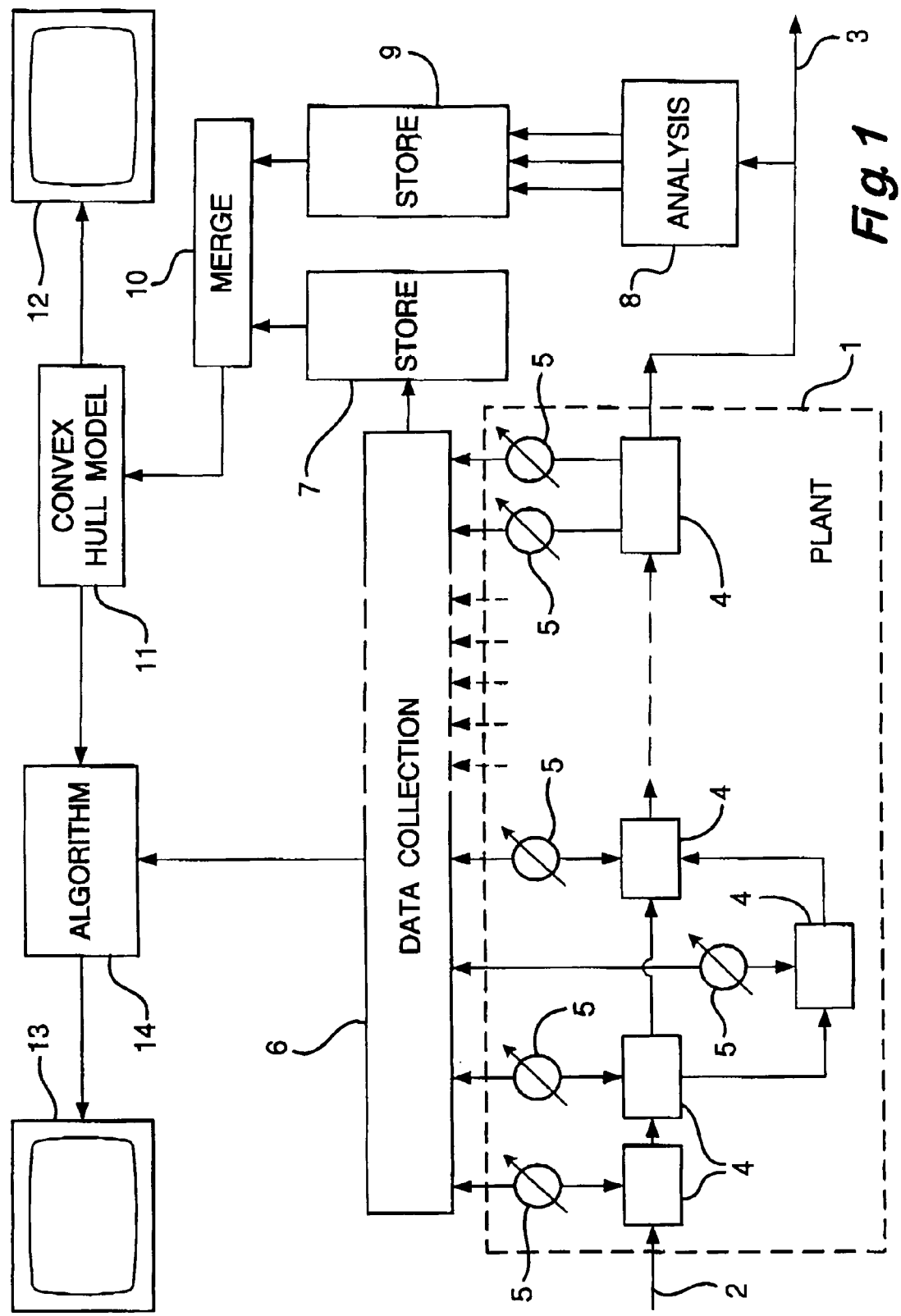
FIG. 1 is a schematic representation of a system according to the invention in the context of collection and utilisation of data derived from operation of a multi-variable processing plant.

Referring to FIG. 1, the plant 1 has an input 2 and an output 3 between which there are, for example, a multiplicity of processing stages 4. The processing within each stage 4 is carried out in accordance with one or more variables that, in this example, are regulated by eleven controllers 5. The values of these variables for each operation or 'run' of the process are communicated to a data collection unit 6 to be accumulated in a store 7. The term 'run' in this context may refer to a discrete operation of the process, but it may also refer to what applies at a discrete point in time within continuous operation.

The outcome at the output 3 of each run of the process, is submitted to a unit 8 for analysis in respect of its quality as determined according to three variables. The values of these three quality variables are accumulated in a store 9, so that each run of the process and its outcome is defined by an accumulated set of fourteen values, eleven in the store 7 and three in the store 9, for the fourteen variables respectively.

As the process is run again and again, a multiplicity of different sets of fourteen values are accumulated, and from these a selection is made to provide a historical record in the stores 7 and 9 of successive runs representing satisfactory operation of the process. This record is used in the method of the present invention as a basis for selection of the values of the various variables appropriate to achieving a particular outcome. More especially, the fourteen values of each individual set, eleven in the store 7 and three in the store 9, are brought together in a merge unit 10 and each scaled to the range 0 to 1. The scaled values are then processed in a unit 11 to plot them in an electronic display unit 12. The scaled values of each set are plotted in fourteen-dimensional space using a system of parallel coordinates as illustrated in FIG. 2.

Figure 2:
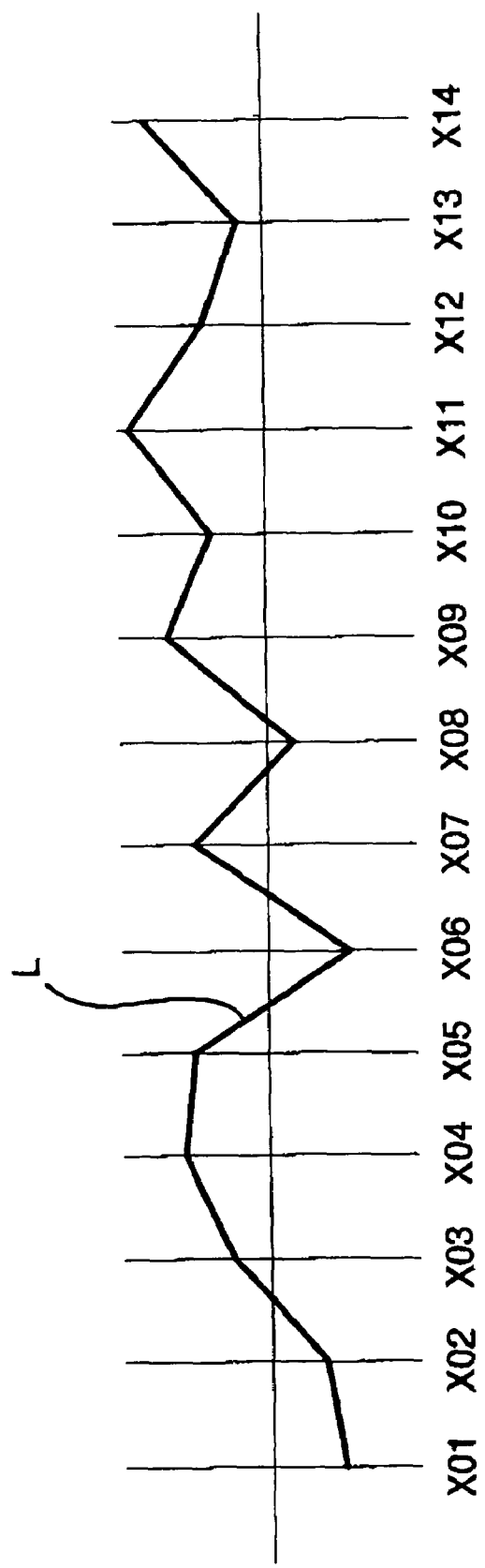
FIG. 2 is illustrative of a plot in multi-dimensional space defined by parallel coordinate axes, of operation of the multi-variable processing plant of FIG. 1.

Referring to FIG. 2, the fourteen values are plotted on fourteen equally-spaced, parallel axes X01-X14 representing the fourteen variables respectively. The first three axes, X01-X03, are used for the quality variables, and the plots are joined up to form a polygonal line L that is representative of the single fourteen-value operating point of the process. The other sets of process-values are each correspondingly plotted against the same axes X01-X14 resulting in a multiplicity of polygonal lines corresponding to the line L; this is illustrated in part in FIG. 3. Each polygonal line is representative of an individual operating point or run of the process from the historical record.

Figure 3:
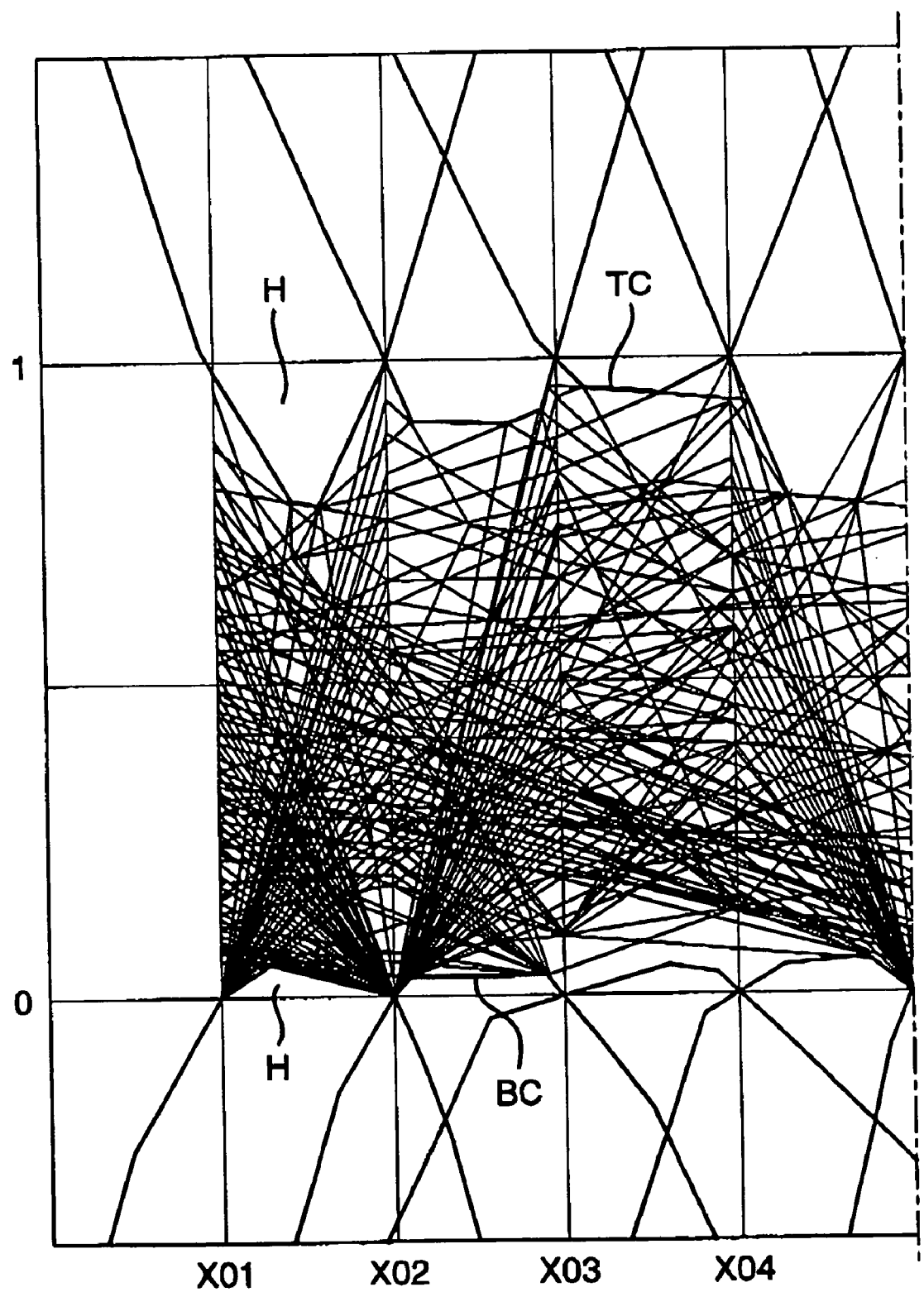
FIG. 3 shows in part a multiplicity of plots corresponding to that of FIG. 2 resulting from successive operations of the multi-variable process.

Referring further to FIG. 3, convex hulls H for all pairs of adjacent variables of the parallel-axis system, are calculated in the unit 11. Between each pair of adjacent axes X01-X14 there will be an upper and lower hull H defining upper and lower limiting boundaries between those two axes, of the operating-point lines. The upper and lower hulls H of the successive pairs of adjacent axes join together to define top and bottom bounds or chains TC and BC respectively. The convex hulls applicable to all other pairings of variables are also calculated.

Figure 4:
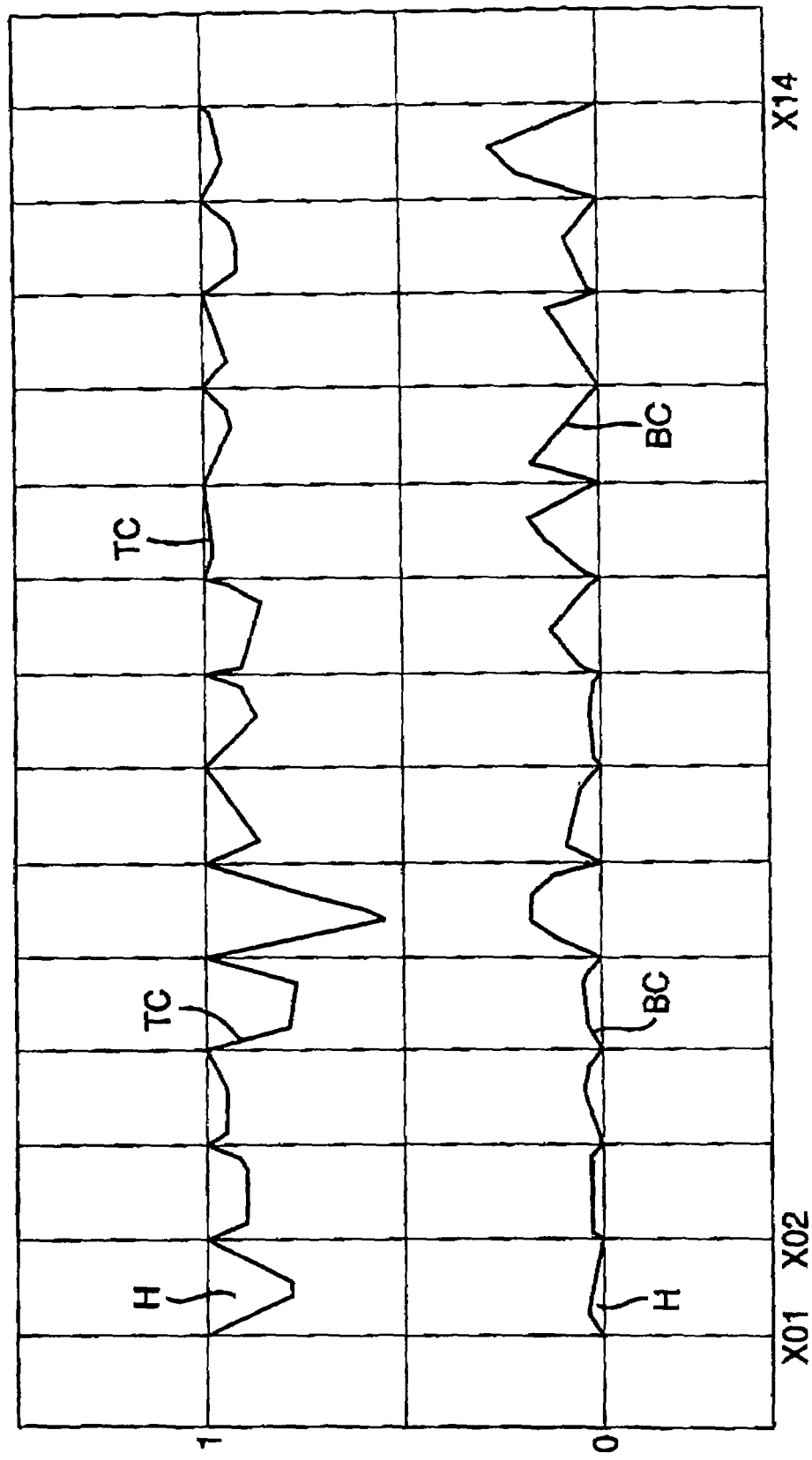
FIG. 4 is illustrative of the display of convex hulls in the system of FIG. 1.

Once the calculation of all the convex hulls has been completed, the upper and lower hulls H between adjacent axes, restricted for simplicity to those parts lying within the range 0 and 1, are communicated to the unit 12 for display as shown in FIG. 4. The upper and lower hulls H between adjacent axes are represented in the display as joining up together as top and bottom chains TC and BC respectively, which define (for example, in colour red) the upper and lower boundaries of a region within which feasible operation of the process can take place. Clearly, the larger the number of historical sets of operational data used, with as wide as possible range of values for the individual variables, the more accurately will this region be defined.

The system also operates to determine appropriate warning alarm levels on plant variables during process operation, and to display these alarm levels and the current values of the corresponding variables to the process operator. This is achieved as illustrated in FIG. 1, using a further electronic display unit 13, however, it is possible for the functions of the units 12 and 13 to be combined into one unit. The display unit 13 is driven from an algorithms unit 14 in accordance with data from the unit 11 and the values of the process variables in real time, supplied from the unit 6.

Whenever a new set of values for the process variables is received, the unit 14 determines which, if any, of the variables have values lying outside a region or zone defined intermediate the top and bottom chains TC and BC. The top and bottom chains TC and BC are defined by the convex hulls applicable between the variables of adjacent axes, but the convex hulls between all the other pairings of variables calculated by the unit 11, overlap them so that there is in general a narrower region or zone within which successful operation can be expected to lie. This narrower zone, nominally the 'best operating zone' ('BOZ'), defines in relation to each variable the range of value which that variable may have due to the value of each other variable. Accordingly, the unit 14 determines in dependence upon data received from the unit 11, the upper and lower limits of these ranges, and whether the current value of any of the processing variables signalled from the unit 6 is outside the BOZ. If the current value of any variable is outside the BOZ, warning is given by indicating this condition in the display of unit 13 or otherwise, and action is taken to determine what change or changes are appropriate to correct the situation.

The display unit 13 provides representation of warning alarm limits for all variables simultaneously. These limits are always calculated using the current values of all the other variables; no model-fitting or statistical assumptions are required, and it is to be understood that reference to 'current' values does not preclude the use of time-lagged values of some variables.

The general form of display provided by the unit 13 is illustrated in each of FIGS. 5 to 7, and the method of operation outlined above will now be described in relation to them. For illustrative purposes, a process is assumed involving ten variables a-j, of which variables i and j are assumed to be quality variables and variables a-h process variables. Of the process variables, variables a-c are assumed to be manipulatable in the sense of being directly controllable.

Figure 5:
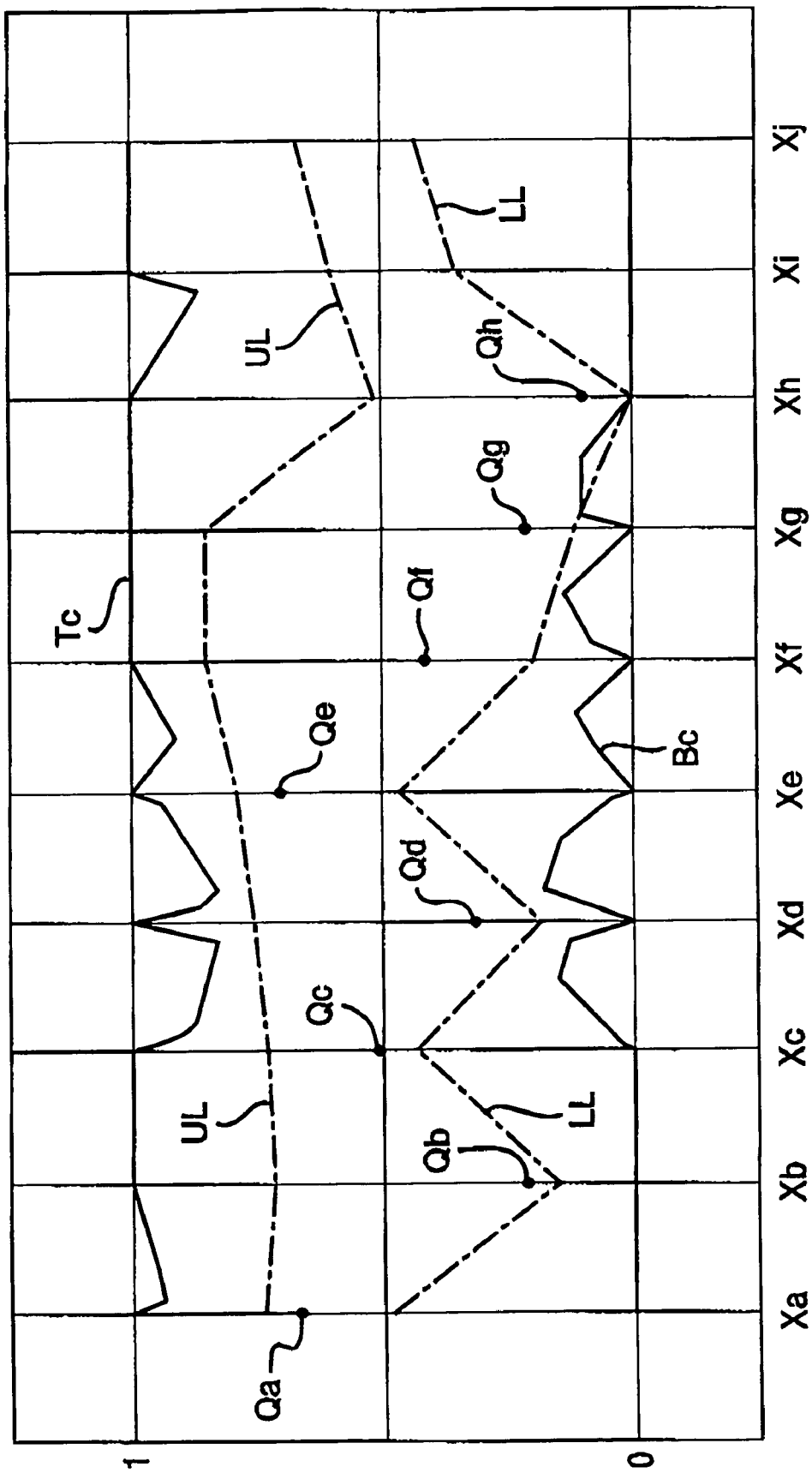
FIGS. 5 to 7 are illustrative of successive displays provided according to the invention in connection with operation of the method and system of the invention.

Referring to FIG. 5, the current values Qa-Qh of the process variables derived from the unit 6 are plotted in the display of unit 13 against respective axes Xa-Xh of a system of ten parallel axes Xa-Xj. At the same time, upper and lower limits for the individual variables a-h calculated by the unit 14 are plotted on their respective axes Xa-Xh and joined up to provide polygonal, upper- and lower-limit lines UL and LL. The lines UL and LL delineate the applicable BOZ. Chains Tc and Bc (corresponding to chains TC and BC respectively of FIG. 4) and representing bounds defined by the convex hulls between the variables of adjacent axes are shown plotted in FIG. 5 (and also in FIGS. 6 and 7), but are optional.

The values of the quality variables i and j are assumed not to be available at the relevant run-time and so no values for them are plotted or shown in the display. However, upper and lower limits for each of them are calculated by the unit 14 from the current values of the process variables a-h. Although the requirement for the values of the process values a-h to be inside the BOZ sets ranges on the quality variables i and j, the ranges due to the current values of the process variables a-h, may be narrower than those specified in selecting the BOZ and hence give useful information.

As each new set of current values is received from the unit 6, the display changes, and the limits on all the variables are re-calculated and shown in the display of unit 13.

In the case illustrated in FIG. 5, the plotted values Qa-Qh are all within the current best-operating zone defined between top and bottom chains Tc and Bc respectively. Upper and lower current limits calculated for the individual variables and plotted on the respective axes Xa-Xj are joined up to provide polygonal lines UL and LL. The lines UL and LL define the zone, namely the BOZ, within which the values of the variables are to be retained. In this example, all values Qa-Qh are within the zone, but this is not so in the circumstances of the display illustrated in FIG. 6.

Figure 6:
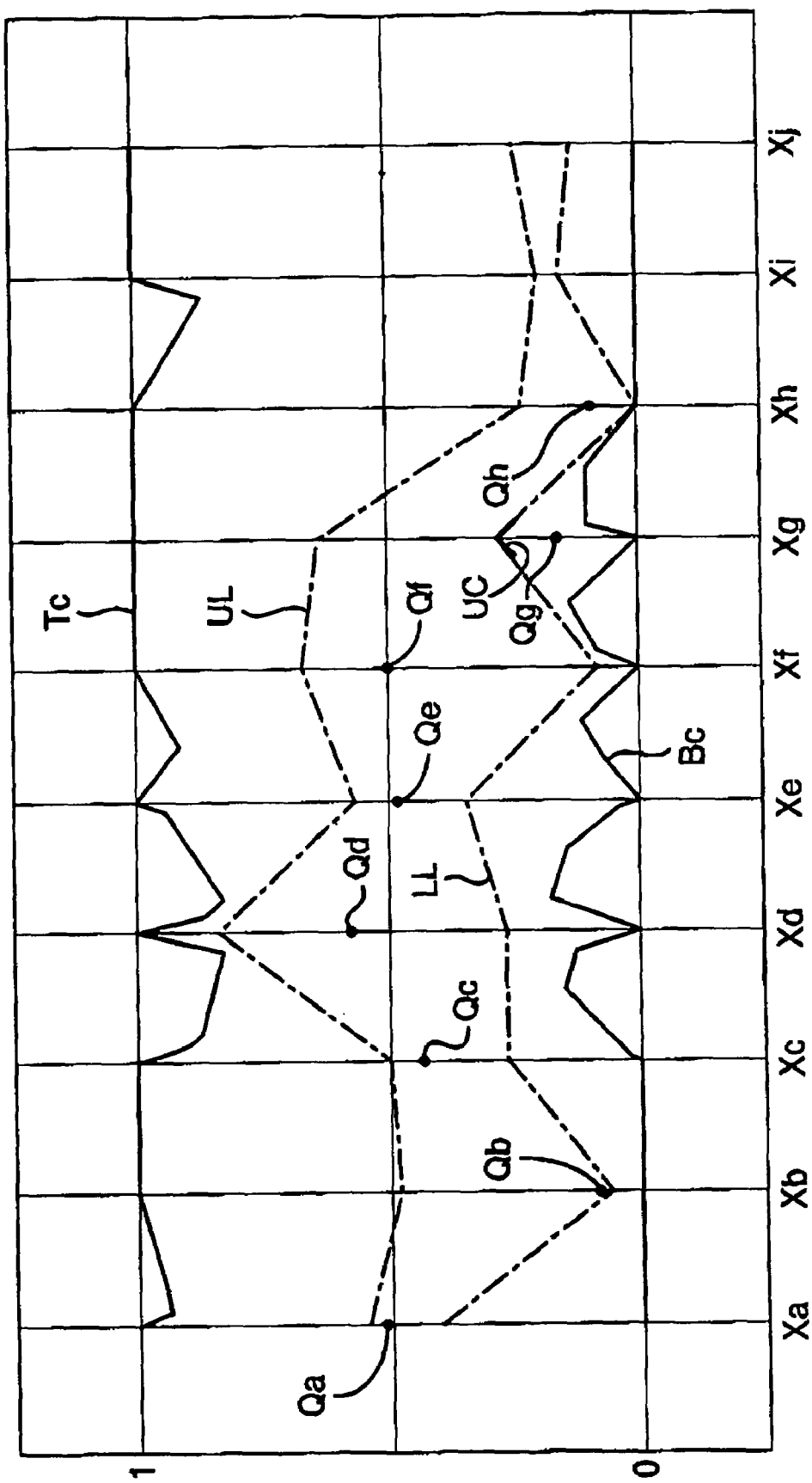

The circumstances of FIG. 6 are those in which the current values Qa-Qh have changed resulting in consequential re-location of the lines UL and LL. The changes have, for example, located the value Qb virtually on the line LL, but it together with each of the values Qa, Qc-Qf and Qh remain within the currently-applicable BOZ. The value of Qg plotted on the axis Xg is, however, below the lower limit LL, and the unit 14 in response to this signifies the existence of an alarm condition. In this respect and as at least part of the alarm condition, the unit 14 enters a caret (for example of colour red) in the display indicating where, and in which sense, the BOZ has been violated. More particularly, in this example, an upwardly-directed caret UC is displayed on the axis Xg where the line intersects that axis, to signify that the value Qg is either on or below the line UL. In the event that the value Qg had been on or above the line UL a similar, but downwardly-directed, carat would have been displayed on the intersection of the line UL with the axis Xg.

The process operator can interact with the display unit 13 to adjust one or more of the fixed values Qa-Qc up or down their respective axes experimentally, to see the effect this has on the limits of the other variables. When an alarm condition exists, and several variables are on or beyond their limits, adjusting the value of even one of them may be found to move the limit lines UL and LL outwardly from one another sufficiently to relieve the alarm condition on the others. Accordingly, using the on-line display of unit 13 in this mode, the operator can not only monitor the current settings and results of the process, but can also be made aware of alarm situations and receive guidance in focussed investigation of the remedial action necessary.

As well as identifying alarm conditions, however, the system is operable in a mode in which the unit 14 calculates a set of changes in the process variables that can be manipulated, in this example the variables a-c, which will clear the alarm condition. These changes can be displayed immediately to the process operator so that he/she may implement them; they may also (or alternatively) be communicated to a process controller for direct, automated implementation.

Figure 7:
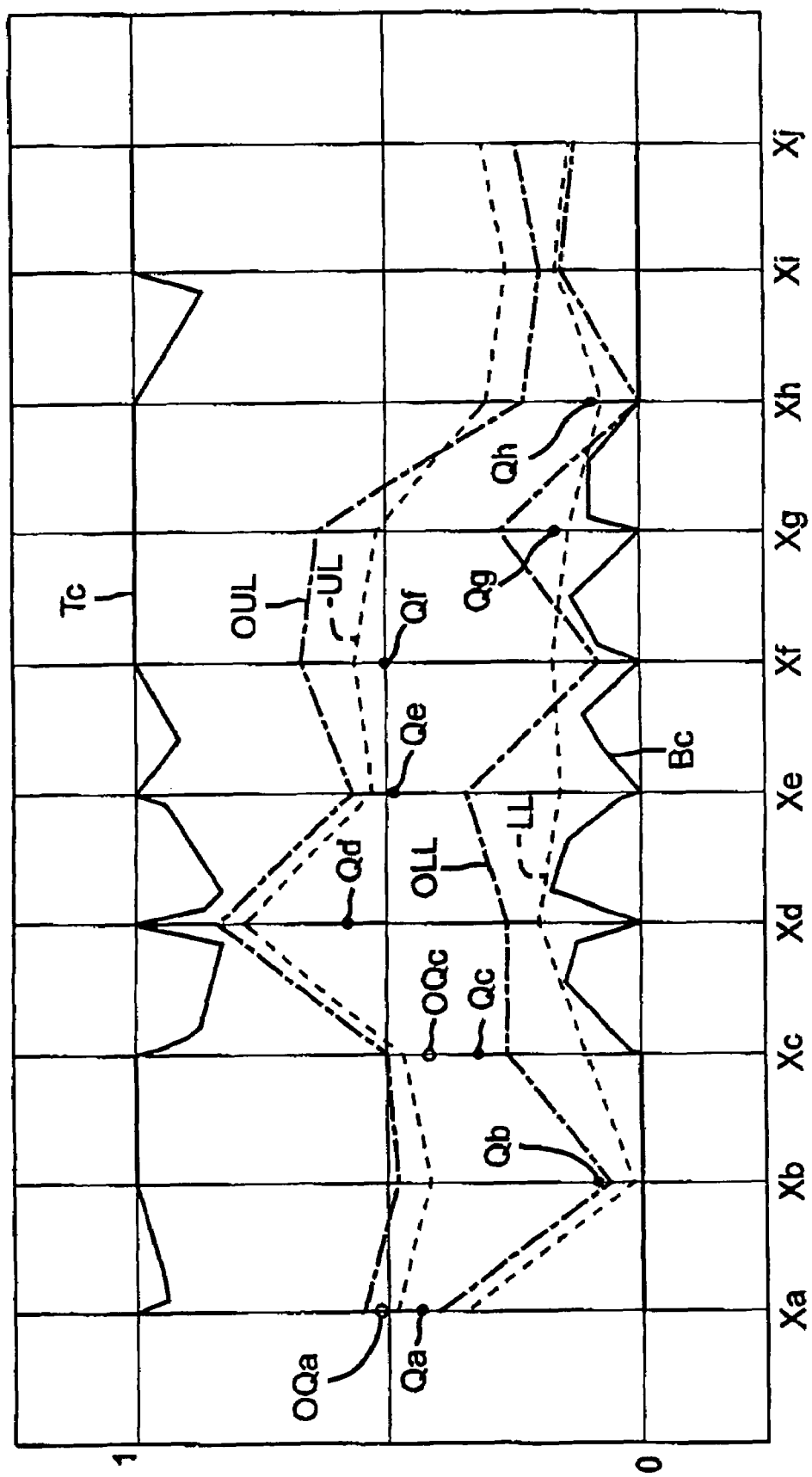

In the latter regard, FIG. 7 shows the result of automatic operation of the system to calculate changes in the variables a-c which will clear the alarm condition represented in FIG. 6.

Referring to FIG. 7, the calculation carried out by the unit 14 in this example, determines that the optimum changes required to clear the alarm condition resulting from the current value of Qg outside the BOZ, is change in the values of variables a and c. More particularly, the changes required are reductions of the values of both variables a-c, and such changes are shown in the display by corresponding movements of the dot-representations of the values Qa and Qc to new locations on the respective axes Xa and Xc positions. The unit 14 in response to the change of values re-calculates the upper and lower limits of each variable and indicates them with lines UL and LL in the display of unit 13.

The former values of the changed variables are retained as open-centre dots OQa and OQc, and the former limits applicable are shown as lines OUL and OLL, for reference purposes until the changes indicated have been implemented. It may even be useful to show the operator information about earlier time-steps. For example, the lines UL and LL could be faded rather than erased each time a new set of data is received, so that the display of the limits for one time-step would vanish over a pre-selected number of time-steps. Alternatively, depending on what the process operator found most useful, the area enclosed by the lines UL and LL might be filled in with solid colour (for example, lime green) that would be faded at each time-step, with the intensities due to a set number of time-steps up to the latest being additive so that the part of the feasible region which has been feasible throughout the largest number of time-steps would have the most intense colour.

It follows from what has been described and explained above that it would be necessary to have available within stores 7 and 9 a significant amount of historical operating data; such data is available from the data bases normally forming part of conventional process-instrumentation. Data collected over a number of different non-contiguous periods may be combined, and in some circumstances data generated by a mathematical model may be used.

Referring further to FIG. 1, the data collected comprises process data accumulated in store 7 and quality data accumulated in store 9. This data as merged in the merge unit 10, is examined to make a selection of all data points which are satisfactory in terms of the values of all the quality and process variables (a "data point" in this regard consists of a set of measurements of all process and quality variables made at one time; some variables may be time-shifted by a constant amount with respect to others). This selection gives the best operating zone (BOZ), and the envelope (in this example represented by the two-dimensional convex hull) of the BOZ (which does not change during process operation) is used to derive limits on the operating variables. These limits are different at every time-step, and are displayed by the display unit 13 in the manner of FIGS. 5 to 7.

While the process is operating, the values of the quality variables accumulated in store 9 will in many cases not be available, as they are obtained from analysis of the product of the process. In this case the algorithms unit 14 uses only the process variables whose values are available in real time. Conceptually, the envelope of the BOZ in the multi-dimensional space defined by all the variables is projected into the multi-dimensional subspace defined by the process variables, and the process is required to remain within this projected envelope. This projected envelope is the envelope of the values of the process variables for all historical data-points for which the values of the process variables and the values of the quality variables were satisfactory.

The algorithms unit 14 in the present context operates according to a control algorithm as well the alarm algorithm referred to above. In the event that one or more alarms are identified from the alarm algorithm at a time-step, the control algorithm is operative to determine first whether any variables are outside their absolute limits. Absolute limits on variables apply regardless of the values of any other variables; absolute limits are shown by upper and lower horizontal lines '1' and '0' respectively of FIGS. 5 to 7. If any manipulated variables (a-c in the example of FIGS. 5 to 7) are outside their absolute limits, they will have to be moved within those limits as part of the alarm rectification, but if any non-manipulated variables are outside their absolute limits, the alarm cannot be fully rectified.

The main work of the control algorithm is to calculate the best set of moves of manipulated variables to rectify alarms where variables are within their absolute limits but outside the limits due to the values of the other variables. In this regard, the control algorithm proceeds by calculating the total infeasibility, that is the sum of the sizes of all violations of limits, and the coefficients of this total infeasibility with respect to each of the manipulated variables. The control algorithm derives a suggested set of new values for the manipulated variables from these coefficients. A suitable algorithm for this purpose will now be described.

The algorithm to be described uses a planar convex hull as described above, but it would also be possible to derive a control algorithm from the constraints obtained by fitting any convenient closed hyper-geometric figure to the BOZ.

Total infeasibility is the sum of the sizes of the differences between the values of all variables that are in alarm, and the limits that they respectively violate. If, for the purposes of illustration, the values of Qa and Qd, are less than the lower-limit values LLa and LLd respectively, calculated for the variables a and d, and the values of Qe and Qh are more than the upper-limit values ULe and ULh respectively calculated for the variables e and h, due to the current values of the feasible variables—that is, b, c, f, g. The total infeasibility in this case is equal to:

(LLa−Qa)+(LLd−Qd)+(Qe−ULe)+(Qh−Ulh)

The coefficient of the total infeasibility with respect to a manipulated variable is the sum of the coefficients of the infeasibilities of all alarms with respect to that variable. If the manipulated variable is itself in alarm, the coefficient of the infeasibility of that alarm is +1 if the upper limit is violated and −1 if the lower limit is violated. For all other alarms the coefficient is the amount by which the violated limit will change for a unit change in the manipulated variable, with a positive sign if the limit moves away from the value of the alarmed variable and a negative sign if it moves towards it.

The coefficient of limit LLn with respect to value Qm can be expressed as:

dLLn/dQm where n is not equal to m, and the variable of axis Xm is a manipulated variable. Accordingly, if in the illustration above, a is a manipulated variable, the coefficient of the total infeasibility with respect to the value of the variable a is:

−1+dLLd/dQa−dULe/dQa−dULh/dQa.

Figure 8:
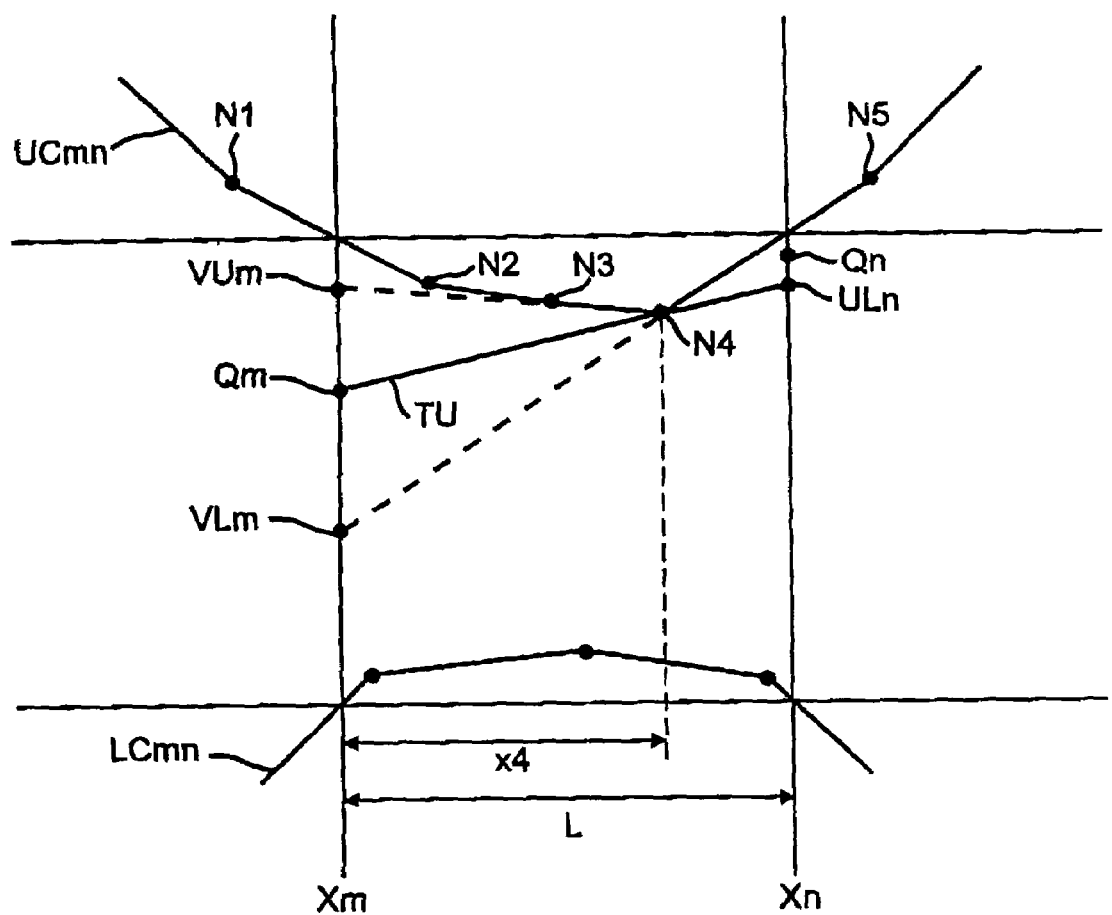
FIG. 8 is illustrative of the derivation of certain coefficients utilised in the method and system of the invention.

Each of the coefficients dLLn/dQm is calculated from the two-dimensional convex hull between axes Xm and Xn. FIG. 8 shows how the coefficient is calculated.

Referring to FIG. 8, a convex hull between axes Xm and Xn of parallel co-ordinates, has upper and lower chains UCmn and LCmn respectively, each comprising an ordered set of points or nodes connected by straight lines; nodes of the upper chain are referenced N1-N5 in FIG. 8. The value of variable m plotted on the axis Xm is indicated as Qm, and ULn is the upper limit on the axis Xn due to Qm. In this regard, ULn is the intercept on the axis Xn of the tangent TU from Qm to UCmn, which touches UCmn at node N4 of chain UCmn. If ULn due to Qm is the most restrictive (lowest) upper limit on axis Xn due to any other variable, ULn is the overall upper limit on axis Xn. In these circumstances, the coefficient dULn/dQm is non-zero, and is given by:

$dULn/dQm = -L/x4$ where x4 is the horizontal distance of node N4 from the axis Xm, and L is the distance between the axes Xm and Xn.

In the case shown in FIG. 8, reducing the value Qm of variable m will reduce the infeasibility on Xn by increasing ULn towards Qn.

The coefficient dULn/dQm is valid for only a finite range of values of Qm. FIG. 8 shows the limiting values VLm and VUm for variable m at which the tangent to the chain UCmn from the point representing value Qm on axis Xm, would touch UCmn at node N5 and node N3 respectively.

The limits on the validity of the coefficient of the total infeasibility with respect to a value Qm are the most restrictive limits on the validity of the coefficients of the infeasibilities of the individual alarms. These limits are further restricted if the limits on any other variable, feasible or infeasible, would reach the current value of that variable, or the limit due to Qm ceases to be the most restrictive.

Using this calculation of the coefficients of the total infeasibility and their limits of validity, the control algorithm proceeds iteratively as follows:

(1) choose the manipulated variable that most reduces the total infeasibility and move it to its limit of validity;

(2) recalculate the total infeasibility and all coefficients and limits; and (3) repeat until the total infeasibility is zero.

When the total infeasibility is zero, the alarm situation has been rectified, and the values of the manipulated variables at this point are the recommended process movement.

The control algorithm described above, which is one of many that could be used, requires the minimum total movement from the current values of the manipulated variables, but other criteria could be used. Constraints and coefficients could be derived from fitting any convenient closed figure to the points of the BOZ instead of the linear convex hull.

The recommended new values of the manipulated variables are displayed on display unit 13 (FIG. 1), and, as referred to above, may also (or alternatively) be used for real-time control of the plant. The control algorithms implemented in known plant-control systems commonly operate by linearising a set of process equations about an operating point, and then solving the resulting set of simultaneous equations to calculate the next variable; this requires constraints (limits) on each variable. Corresponding constraints on each variable are also required by process control systems (sometimes known as 'real-time optimisers') using large sets of equations solved by other means. The constraints in each case are set manually by process operators because no method for calculating the correct values for the limits on the variables, is currently available to them in practice.

However, the envelope method described above can be used to calculate values for the relevant constraints, using the current operating point. These constraints are then used by the control algorithm to calculate a new operating point, and the method then re-applied to calculate new constraints related to this new operating point. This two-phase use of the method and the control algorithm is continued iteratively until convergence to the best solution is obtained.

The two-phase method described above has significant advantages. More especially, the control algorithm is made to obey the product quality and other requirements built into the BOZ envelope, not just the requirements on variables that are measured in real time. Secondly, the operator is not left to assign values to variable constraints without a defined logic, thus avoiding the effect of driving the process into a constraint 'corner' from which a satisfactory operating point cannot be found. Thirdly, the closer relationship between the control algorithm connection and the envelope calculation allows the control to achieve a smaller operating region, which is equivalent to more nearly optimal operation of the process.

Figure 9:
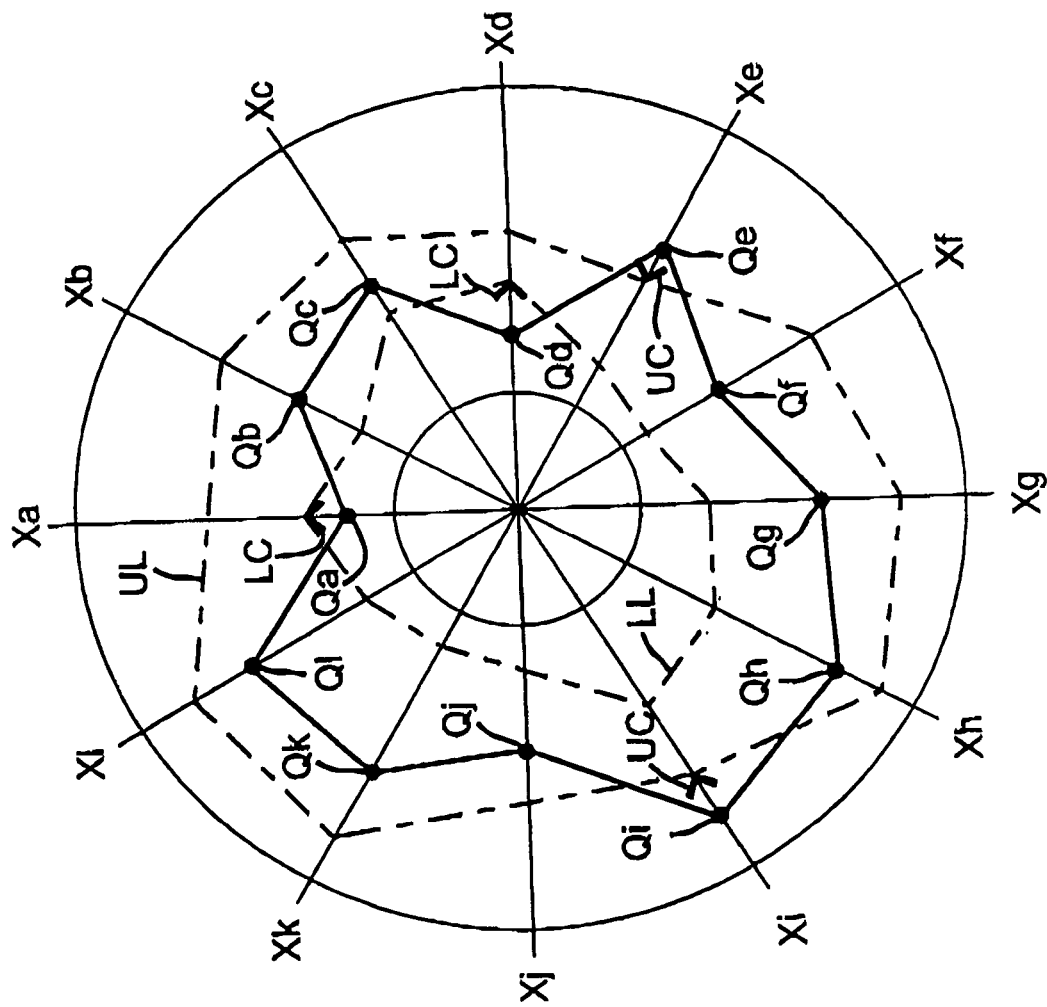
FIG. 9 shows an alternative form of display representation that may be used in accordance with the invention.

Alarms and recommended process movement may also, or as an alternative, be displayed on a circular plot (sometimes known as a 'radar plot' or 'spider diagram') rather than in the linear forms illustrated in FIGS. 5 to 7. In this case the axes are arranged as the spokes of a wheel with equal angles between them, as illustrated in FIG. 9 for a circular plot of twelve variables Xa-Xl. All calculations are performed using the parallel co-ordinate system, it being the display alone that is transformed to circular form.

Referring to FIG. 9, polygonal lines UL and LL (for example in green, represented here in dashed line) show the current upper and lower limits respectively on the variables. In this case the lines UL connecting the upper limits form a closed figure, as do the lines LL connecting the lower limits. Dots Qa-Ql (for example in blue) representing the current values of the process variables are joined by a solid (blue) line to assist the operator to recognise the 'shape' of the current operating point. Where a variable is outside its limits a caret (for example in red) appears at the violated limit, a caret UC (as illustrated for axes Xe and Xl) where the upper limit UL is violated and a caret LC (as illustrated for axes Xa and Xd) where the lower limit LL is violated. The operation of the system to calculate and indicate the corrections required to rectify the alarm condition indicated by the display of FIG. 9 is unchanged.

The invention claimed is:

1. A method for enhancing control of operation of a multi-variable process, the method comprising the steps of:
   (a) deriving a multi-dimensional representation of process variables of the process according to individual coordinate axes, the derived multi-dimensional representation of the process variables including representing current values of the individual process variables on respective ones of the coordinate axes;
   (b) defining a feasible region of the process variables, the feasible region being based on sets of values for the process variables accumulated respectively in relation to a multiplicity of previous operations of the process to establish limits for each of the process variables individually;
   (c) defining, for each process variable, a range within which the current value of that process variable is to lie in order for operation of the process to remain within the feasible region, the range defined for each individual process variable being dependent on the values of the others of the process variables;
   (d) detecting, in respect of each of the process variables, whether an alarm condition exists, and an alarm condition existing in respect of that process variable when the current value of that process variable lies outside the range defined for that process variable;
   (e) responding to the existence of the alarm condition in respect of any of the process variables to calculate change of the value of at least one of the process variables required for annulling the alarm condition;
   (f) indicating, in relation to the one process variable, the calculated change of value required for annulling the alarm condition, and the step of indicating the calculated change including a step of providing a visual display of the derived multi-dimensional representation of the process variables, the visual display comprising representation of the coordinate axes, representation of the current values of at least some of the process variables on their respective coordinate axes, and representation of the ranges defined individually for the process variables represented in the display, the calculated change of value required for annulling the alarm condition being represented in the visual display by a displacement of the representation of the current value of at least one of the process variables along a respective coordinate axis of the displayed process variable; and
   (g) changing the value of the one process variable in accordance with the calculated change for annulling the alarm condition.

2. The method according to claim 1, further comprising the step of defining the feasible region by convex hulls derived between pairs of the process variables.

3. The method according to claim 1, further comprising the step of indicating the existence of an alarm condition, in respect of any variable represented in the display, on the coordinate axis of that variable.

4. The method according to claim 1, further comprising the step of having the axes of the multi-dimensional display representation parallel to one another.

5. The method according to claim 1, further comprising the step of angularly spacing the axes of the multi-dimensional display representation from one another.

6. The method according to claim 1, further comprising the step of using an iterative process for calculation of the change of the value of the one process variable for annulling the alarm condition.

7. The method according to claim 6, further comprising the steps of determining for each of the process variables for which the alarm condition exists the difference amount by which the value of that variable lies outside the range defined for that variable, summing all the difference amounts to derive a total of infeasibility, selecting from the process variables for which the alarm condition exists the process variable for which change most reduces the total of infeasibility, re-calculating the total of infeasibility using a limiting value for the process variable selected, and repeating the sequence of selection and re-calculation until the re-calculated total of infeasibility is reduced to zero.

8. The method according to claim 1, further comprising the step of changing the value of the one process variable by control exercised by an operator in accordance with the calculated change for annulling the alarm condition.

9. The method according to claim 1, further comprising the step of using an automated process controller for the step of changing the value of the one process variable.

10. A system for enhancing control of operation of a multi-variable process, the system comprising:
   (a) means for deriving a multi-dimensional representation of process variables of the process according to individual coordinate axes, the derived multi-dimensional representation of the process variables including representation of current values of the individual process variables on respective ones of the coordinate axes;
   (b) means for defining a feasible region of the process variables, the feasible region being based on sets of values for the process variables accumulated respectively in relation to a multiplicity of previous operations of the process to establish limits for each of the process variables individually;
   (c) means defining for each process variable a range within which the current value of that process variable is to lie in order for operation of the process to remain within the feasible region, the range defined for each individual process variable being dependent on the values of the others of the process variables;
   (d) means for detecting in respect of each of the process variables whether an alarm condition exists, and an alarm condition existing in respect of that process variable when the current value of that process variable lies outside the range defined for that process variable;

(e) means responding to the existence of the alarm condition in respect of any of the process variables to calculate change of the value of at least one of the process variables required for annulling the alarm condition; and (f) means for displaying the calculated change, the means for displaying the calculated change including a means for providing a visual display of the derived multi-dimensional representation of the process variables, the visual display comprising representation of the coordinate axes, representation of the current values of at least some of the process variables on their respective coordinate axes, and representation of the ranges defined individually for the process variables represented in the display, the calculated change of the value required for annulling the alarm condition being represented in the visual display by a displacement of the representation of the current value of at least one of the process variables along a respective coordinate axis of the displayed process variable.

11. The system according to claim 10, wherein the feasible region is defined by convex hulls derived between pairs of the process variables.

12. The system according to claim 10, wherein the existence of an alarm condition in respect of any variable represented in the display is indicated on the coordinate axis of that variable.

13. The system according to claim 10, wherein the axes of the multi-dimensional display representation are parallel to one another.

14. The system according to claim 10, wherein the axes of the multi-dimensional display representation are spaced from one another angularly.

15. The system according to claim 10, wherein calculation of change of the value of the one process variable for annulling the alarm condition, is an iterative process.

16. The system according to claim 15, wherein the calculation involves determining for each of the process variables for which the alarm condition exists the difference amount by which the value of that variable lies outside the range defined for that variable, summing all the difference amounts to derive a total of infeasibility, selecting from the process variables for which the alarm condition exists the process variable for which change most reduces the total of infeasibility, re-calculating the total of infeasibility using a limiting value for the process variable selected, and repeating the sequence of selection and re-calculation until the re-calculated total of infeasibility is reduced to zero.

17. The system according to claim 10, including a process controller, and wherein the calculated change is communicated to the process controller for automating the calculated change.

* * * * *